No. 866,154.  
PATENTED SEPT. 17, 1907.
J. E. MUHLFELD.
JOURNAL BEARING FOR CAR AND OTHER AXLES.
APPLICATION FILED APR. 27, 1907.
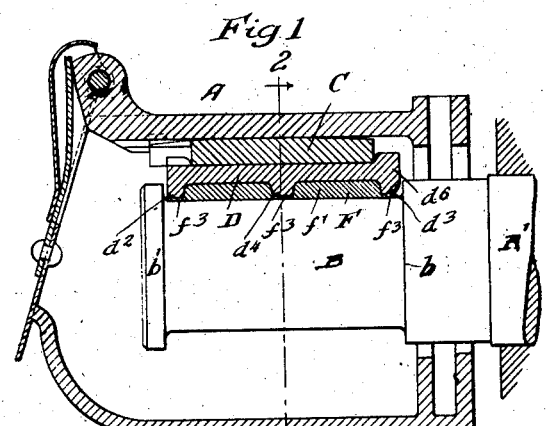
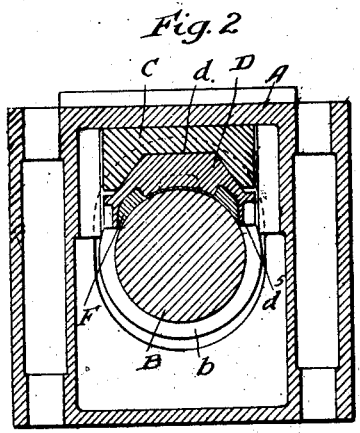
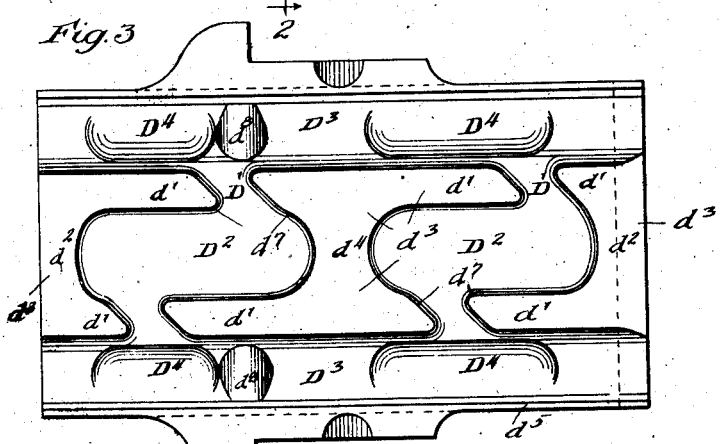
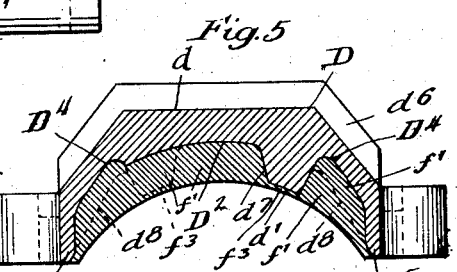
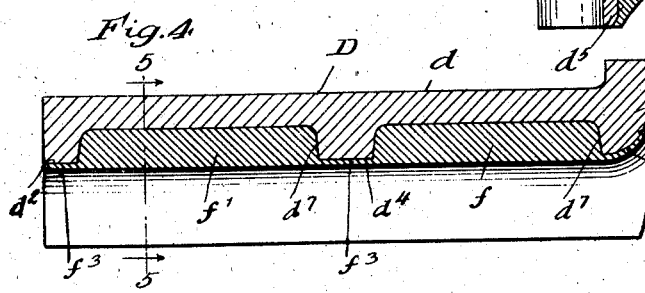
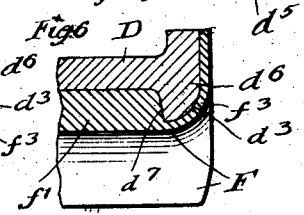
Witnesses:  
Wm. Geiger  
H. M. Munday
Inventor:  
John E. Muhlfeld  
By Munday, Evarts, Adcock & Clarke.  
Attorneys

UNITED STATES PATENT OFFICE.

JOHN E. MUHLFELD, OF BALTIMORE, MARYLAND.

JOURNAL-BEARING FOR CAR AND OTHER AXLES.

No. 866,154.

Specification of Letters Patent.

Patented Sept. 17, 1907.

Application filed April 27, 1907. Serial No. 370,560.

*To all whom it may concern:*

Be it known that I, JOHN E. MUHLFELD, a citizen of the United States, residing in Baltimore, in the State of Maryland, have invented a new and useful Improvement in Journal-Bearings for Car and other Axles, of which the following is a specification.

My invention relates to journal bearings for car and other axles.

The object of my invention is to provide a composite journal bearing consisting of two metallic portions of different compositions, in which each portion will be an integral solid mass; in which both portions will have efficient wearing qualities as a bearing; in which one or both portions may be forged, cast or flowed to the required shape or form; in which both portions will be securely united together and together form one solid body; in which the shell or main portion of the bearing will be of such metal and of such form, construction or design as will give sufficient strength to support the journal and at the same time provide a proper and sufficient bearing surface and metal, so shaped and located that no extreme danger can occur to any portion of the journal proper or the collar at either end of the same that may come in contact with such main portion or shell; in which the main or shell portion of the bearing will serve as an efficient bearing for the axle journal in case the auxiliary or lining portion of the bearing becomes melted out or destroyed from a hot box or other cause; in which the composite journal bearing will have one or more continuous strips of soft metal filling or auxiliary portion from extreme end to end of the bearing, so that carbonized oil, grit, waste, and other foreign material which may tend to come between the axle journal and the bearing at the initial or tangential points of contact, will tend to bed in the softer metal and not come in contact with the longitudinal ribs of the harder and stronger metal of the main portion of the shell; in which the soft metal filling or auxiliary portion of the bearing will be contained or incased by the longitudinal and end bearing ribs of the main portion of the bearing directly below and within the sides and ends of the upper flat rectangular contact face of the main portion or shell which comes in contact with the journal bearing key or wedge, so that this portion of the soft metal filling can only be removed by melting when the journal bearing is in position on the journal; in which the wear at one or both ends of the bearing due to contact with the collars of the axle journal, or what is commonly called "end play", can be taken up and the bearing restored to its original proper dimensions and put again in suitable condition by refilling without the necessity for remaking the main or shell portion of the bearing; in which the main or shell portion of the bearing may be cast or produced from a single solid pattern without the use of a separate core or the necessity for machining in order to provide such main or shell portion with the cavities for receiving the soft metal lining or auxiliary portion of the bearing; in which, when the journal bearing is newly applied, the axle journal will only come in contact with the soft metal lining or auxiliary portion of the bearing, and after wear takes place the journal will come in contact with both portions or compositions of metal; in which the journal bearing will be interchangeable with the Master Car Builders' standard journal bearings, journals, journal bearing keys and journal boxes; which will be more efficient and durable in operation than the journal bearings heretofore in use; and which at the same time may be more cheaply manufactured.

My invention consists in the means I employ to practically accomplish the above mentioned object or result in a single unitary structure or journal bearing, as herein shown and described; and more particularly specified in the claims.

In the accompanying drawing forming a part of this specification, Figure 1 is a central vertical longitudinal section of a journal bearing embodying my invention; Fig. 2 is a vertical section on line 2—2 of Fig. 1; Fig. 3 is a detail bottom view of the main or shell portion of the journal bearing; Fig. 4 is a vertical longitudinal section; Fig. 5 is a detail cross section on line 5—5 of Fig. 4, and Fig. 6 is a detail partial longitudinal section similar to Fig. 4.

In the drawing A represents the journal box, B the journal and $B^1$ the car or other axle, $b$ and $b^1$ the inner and outer collars or shoulders at the ends of the journal, and C the journal bearing key or wedge, all these parts being of the standard Master Car Builders' type or construction.

D F is my improved construction of journal bearing, it also being of the standard Master Car Builders' interchangeable form.

My improved composite journal bearing comprises a main or shell portion D, preferably of brass, or other hard, strong and efficient bearing-composition of metals in one solid integral mass, and a soft metal bearing or auxiliary portion F of Babbitt or other suitable bearing-composition of metals, the same also being in one solid composition of metals, the two portions D F of the bearing being integral mass, the two portions D F of the bearing being securely united together, preferably by a brazing or soldering union between the two metallic compositions, taking place when the softer lining is flowed into or upon the main shell or brass portion D of the bearing.

The main portion or shell D has the customary flat rectangular upper face $d$ which comes in contact with the journal bearing key or wedge C, and it is provided on its inner or bearing face with integral longitudinal bearing ribs $d^1$ having curved bearing faces $d^3$ and integral end bearing ribs $d^2$, having curved bearing faces $d^3$, and an intermediate transverse connecting bearing rib $d^4$, the longitudinal bearing ribs $d^1$ having connecting channels $D^1$ through the same, staggered or breaking joints in respect to each other, so as not to materially transversely weaken the shell or main portion of the bearing, and which channels connect the central longitudinal cavities $D^2$ with the longitudinal side cavities $D^3$ into which the soft metal lining or auxiliary portion F of the bearing is flowed, cast or otherwise applied so as to securely unite the two portions D F of the bearing together. The main or shell portion D of the journal bearing also has longitudinal marginal ribs or sides $d^5$ to confine the soft metal lining or auxiliary portion F, and give strength to the journal bearing as a whole. These marginal longitudinal ribs or sides $d^5$ are not bearing members and are not designed to come in contact with the journal of the axle, except that they may contact at their ends with the shoulders or collars $b$ $b^1$ of the journal.

The soft metal lining or auxiliary portion F of the journal bearing is in one solid integral mass, having thick portions $f^1$ filling the central cavities $D^2$ of the shell D, thick portions $f^1$ filling the longitudinal side cavities $D^3$ and the sub-cavities or depressions $D^4$ therein, and thick portions $f^1$ filling the staggered connecting channels $D^1$ which connect the central cavities $D^2$ with the longitudinal side cavities $D^3$, and thinner portions $f^3$ covering the curved bearing faces $d^3$ of the longitudinal and end bearing ribs $d^1$ $d^2$ and intermediate bearing ribs $d^4$ of the main or shell portion D of the journal bearing. This thinner portion $f^3$ of the soft metal lining or auxiliary portion F of the journal bearing may be extended over the curved end face $d^6$ of the main or shell portion D when the latter becomes so shortened by wearing contact with the collar of the axle journal as to render this necessary in refilling the main or shell portion D with the lining metal F, in order to restore the refilled journal bearing as a whole to its normal or standard length and shape. To enable the main or shell portion D of the journal bearing to be cast in one piece without cores or machining to form cavities therein to receive the lining metal F, the side walls of all these cavities are preferably made with a slight flare $d^7$, so that the mold may be readily formed from a single pattern. And, after the main shell D has become worn or shortened, when it is placed back in a mold formed by the same pattern to be refilled with the lining metal F, when thus again refilled the journal bearing as a whole will be of the standard shape in length and size.

The main or shell portion D of the journal bearing is furnished at its longitudinal marginal ribs or sides $d^5$ with rounded tapering, inwardly extending strengthening projections $d^8$ which project into the longitudinal side cavities $D^3$. The longitudinal end and central bearing ribs $d^1$ $d^2$ and $d^4$ of the main or shell portion D of the journal bearing are all in one solid integral piece or mass with said shell D, and are of sufficient size and area of bearing face as to operate as a safe and efficient bearing for the journal, independent of the auxiliary portion or lining F in case the softer bearing member is entirely melted or flowed out, from a hot box or other cause, so that the car will not be crippled or the train delayed and rendered unable to travel to the next station. And these bearing ribs of the main or shell portion D being constructed and disposed as herein shown and described, also give the brass or shell portion D the necessary strength, stiffness and rigidity.

My improved composite journal bearing it will be noted is composed of but two parts or portions D and F, which are firmly and securely locked and united together, so that they in effect form one integral solid mass, and as both portions D and F are composed of an efficient bearing or wearing metal or metallic compound, and as one of these portions D has the requisite mass and bearing face area in itself alone to act as an efficient journal bearing, in case the softer or auxiliary or lining portion F should flow out or become melted, and as both portions D and F contact with the journal when the thinner portion $f^3$ of the lining F becomes worn away, it will be understood by those skilled in the art and familiar with the practical use of car axle journal bearings, that my improved composite journal bearing is peculiarly fitted and adapted to meet all the conditions and requirements of a successful and practical car axle journal bearing, and possesses in a very high degree the necessary characteristics of strength, rigidity, freedom from liability to distortion under pressure of the load thereon, safety, durability, adaptability to be readily refilled with a new lining or auxiliary portion F and restored to original shape and efficiency, while at the same time its original cost of manufacture is materially less than that of other journal bearings heretofore in use, and having a main or shell portion composed of brass or other bearing metal or composition of metals.

The curved bearing faces $d^3$ of the longitudinal end and transverse bearing ribs $d^1$ $d^2$ $d^4$ of the main or shell portion D of the journal bearing, are preferably turned to true shape before the soft metal lining or auxiliary portion F is applied, so that when said lining or auxiliary portion F becomes worn the journal will have smooth bearing faces on said bearing ribs to contact with.

Fig. 6 illustrates my improved composite journal bearing as renewed or refilled with the soft metal lining or auxiliary portion F after the main or shell portion D has become worn and shortened by use, so that when refilling the same with the lining F the latter will extend over the end face $d^6$ of the main or shell portion D.

As in my improved journal bearing the main or brass shell is imperforate and simply provided with cavities which do not extend through it for the soft metal lining on its under face, the soft metal lining will not be forced or squeezed upward through the main shell under pressure of the load on the journal or when the soft metal lining is softened by heat, which would not only displace the soft metal lining but also produce improper contact or bearing between the main shell and the journal box-key or wedge above the main shell. And as, in my invention, the cavities in the main shell for the soft metal lining are connected by the staggered channels $D^1$, in case the bearing heats and melts the soft metal filling, the molten filling in the central cavities $D^2$ $D^2$ may flow out by gravity through the connecting channels $D^1$ so that the molten filling does not itself cause the journal to cut and burn off by being confined in contact therewith or forced between the curved wearing surface of the journal and brass. As in my journal bearing the main or brass shell is imperforate and extends from end to end and is provided with substantial end bearing ribs $d^2$, it is adapted to successfully withstand or resist the side thrust of the journal and is not liable to yield, be compressed or shortened under such side thrust even though the soft metal filling or lining should melt or flow out; nor does such side thrust tend to squash the lining upward, as is the case in journal bearings where the main shell is provided with slots or openings through it for the soft metal filling. And as my improved journal bearing is composed of but two members, both of which are of efficient wearing or bearing metal, it contains no iron or steel or other part to come in contact with the journal and destroy it. And as in my journal bearing, the main or brass shell in itself alone serves not only to afford the strength to withstand the load, but also as an efficient bearing or wearing member for the journal even if the soft metal filling should heat and flow out, it is exceedingly reliable in operation and is little liable to accident, breakage or failure.

I claim:

1. A composite journal bearing, comprising in combination an imperforate main or shell portion of strong, hard, bearing metal in one integral mass, having a rectangular flat upper contact face to engage the journal bearing key or wedge, and provided with integral longitudinal and end bearing ribs and a central transverse connecting bearing rib on the under face, all lying below and within the sides and ends of said upper rectangular key contact face, and further provided with longitudinal marginal ribs or sides, and having also central longitudinal cavities transversely separated from each other by said central transverse bearing rib, and longitudinal side cavities and connecting channels between said longitudinal side cavities and said central cavities, and a soft metal lining or auxiliary portion in one integral mass filling said central and longitudinal cavities and connecting channels and extending over the curved bearing faces of said longitudinal end and central transverse bearing ribs of said main or shell portion of the journal bearing and securely united thereto, substantially as specified.

2. A composite journal bearing, comprising in combination an imperforate main or shell portion of strong, hard bearing metal in one integral mass having a rectangular flat upper contact face to engage the journal bearing key or wedge, and provided with integral longitudinal and end bearing ribs on the under face, all lying below and within the sides and ends of said upper rectangular key contact face, and further provided with longitudinal marginal ribs or sides and having also central longitudinal cavities separated from each other and longitudinal side cavities and connecting channels between said longitudinal side cavities and said central cavities, and a soft metal lining or auxiliary portion F in one integral mass filling said central and longitudinal cavities and connecting channels and extending over the curved bearing faces of said longitudinal and end ribs of said main or shell portion of the journal bearing and securely united thereto, substantially as specified.

3. The composite journal bearing, comprising an imperforate bearing-metal shell in one integral mass having an upper flat key-contact face, longitudinal and end bearing ribs under and between the sides and ends of said flat key contact face, provided with central and longitudinal side cavities, and a soft or auxiliary metal portion filling said cavities and extending over the bearing faces of said bearing ribs, substantially as specified.

4. The composite journal bearing, comprising an imperforate bearing metal shell in one integral mass having an upper flat key contact face, longitudinal and end bearing ribs under and between the sides and ends of said flat key contact face, provided with central and longitudinal side cavities having staggered connecting channels through said longitudinal bearing ribs, and a soft or auxiliary metal portion filling said cavities and extending over the bearing faces of said bearing ribs, substantially as specified.

5. A composite journal bearing, comprising in combination an imperforate main or shell portion D of hard, strong bearing-metal in one integral mass, having an upper flat key contact face $d$, longitudinal and end bearing ribs $d^1$ $d^2$ under and within said flat upper key contact face $d$, marginal longitudinal ribs or sides $d^5$, central and longitudinal side cavities $D^2$ $D^3$, and soft metal lining or auxiliary portion F filling said cavities at its thicker portions and extending over said bearing ribs at its thinner portions, substantially as specified.

6. A composite journal bearing, comprising in combination an imperforate main or shell portion D of hard, strong bearing-metal in one integral mass, having an upper flat key contact face $d$, longitudinal and end bearing ribs $d^1$ $d^2$ under and within said flat upper key contact face $d$, marginal longitudinal ribs or sides $d^5$, central and longitudinal side cavities $D^2$ $D^3$, and soft metal lining or auxiliary portion F filling said cavities at its thicker portions and extending over said bearing ribs at its thinner portions, said main portion or shell L having also a central transverse bearing rib $d^4$ connecting said longitudinal bearing ribs $d^1$, substantially as specified.

7. A composite journal bearing comprising in combination an imperforate main shell portion of hard, strong bearing metal having an upper flat key contact face, longitudinal and end bearing ribs, a central transverse bearing rib and marginal longitudinal ribs or sides and provided with central and longitudinal side cavities and connecting channels between said central and said longitudinal side cavities, said cavities having slightly flaring marginal walls and a soft metal lining filling said cavities, substantially as specified.

8. A composite journal bearing, comprising in combination an imperforate main or shell portion D of hard, strong bearing metal in one integral mass, having an upper flat key contact face $d$, longitudinal and end bearing ribs $d^1$ $d^2$ under and within said flat upper key contact face $d$, marginal longitudinal ribs or sides $d^5$, central and longitudinal side cavities $D^2$ $D^3$, and soft metal lining or auxiliary portion F filling said cavities at its thicker portions and extending over said bearing ribs at its thinner portions, said main or shell portion D having connecting channels between said central and longitudinal side cavities, substantially as specified.

9. A composite journal bearing, comprising in combination an imperforate main or shell portion D of hard, strong bearing metal in one integral mass, having an upper flat key contact face $d$, longitudinal and end bearing ribs $d^1$ $d^2$ under and within said flat upper key contact face $d$, marginal longitudinal ribs or sides $d^5$, central and longitudinal side cavities $D^2$ $D^3$, and soft metal lining or auxiliary portion F filling said cavities at its thicker portions and extending over said bearing ribs at its thinner portions, said main or shell portion D having connecting channels between said central longitudinal side cavities extending through said longitudinal bearing ribs and staggered in respect to each other, substantially as specified.

10. A composite journal bearing, comprising in combination an imperforate main or shell portion D of strong hard bearing-metal in one integral mass, and having a flat key contact upper face, and provided on its under side with longitudinal marginal ribs or sides $d^5$, longitudinal and end bearing ribs $d^1$ $d^2$, and central transverse bearing rib $d^4$, and furnished with central longitudinal cavities $D^2$ and longitudinal side cavities $D^3$ and connecting channels $D^1$, and a soft bearing metal lining or auxiliary portion F filling said cavities and connecting channels in one integral mass at its thicker portions, and covering said bearing ribs at its thinner portions, substantially as specified.

11. A composite journal bearing, comprising in combination an imperforate main or shell portion D of strong hard bearing-metal in one integral mass, and having a flat key contact upper face, and provided on its under side with longitudinal marginal ribs or sides $d^5$, longitudinal and end bearing ribs $d^1$ $d^2$, and central transverse bearing rib $d^4$, and furnished with central longitudinal cavities $D^2$ and longitudinal side cavities $D^3$ and connecting channels $D^1$, and a soft bearing metal lining or auxiliary portion F filling said cavities and connecting channels in one integral mass at its thicker portions, and covering said bearing ribs at its thinner portions, said connecting channels being staggered in respect to each other, substantially as specified.

12. A composite journal bearing, comprising in combination an imperforate main or shell portion D of strong hard bearing-metal in one integral mass, and having a flat key contact upper face, and provided on its under side with longitudinal marginal ribs or sides $d^5$, longitudinal and end bearing ribs $d^1$ $d^2$, and central transverse bearing rib $d^4$, and furnished with central longitudinal cavities $D^2$ and longitudinal side cavities $D^3$ and connecting channels $D^1$, and a soft bearing metal lining or auxiliary portion F filling said cavities and connecting channels in one integral mass at its thicker portions, and covering said bearing ribs at its thinner portions, said connecting channels being staggered in respect to each other, and said longitudinal marginal ribs or sides $d^5$ having projections $d^3$ extending into said longitudinal side cavities $D^3$, substantially as specified.

13. A composite journal bearing comprising in combination an imperforate main shell portion of hard, strong bearing metal having an upper flat key contact face, longitudinal and end bearing ribs, a central transverse bearing rib and marginal longitudinal ribs or sides and provided with central and longitudinal side cavities and connecting channels between said central and said longitudinal side cavities, said cavities having slightly flaring marginal walls and a soft metal lining filling said cavities at its thicker portions and extending over said bearing ribs at its thinner portions, substantially as specified.

14. A composite journal bearing comprising an imperforate bearing metal shell having an upper key contact face, and provided with longitudinal and end bearing ribs on its under face and furnished with central and longitudinal side cavities and connecting channels between said central and said longitudinal side cavities and a soft metal lining filling said cavities and connecting channels, substantially as specified.

15. A composite journal bearing comprising an imperforate bearing metal shell having an upper key contact face, and provided with longitudinal and end bearing ribs on its under face and furnished with central and longitudinal side cavities and connecting channels between said central and said longitudinal side cavities and a soft metal lining filling said cavities and connecting channels, and extending over the bearing faces of said bearing ribs, substantially as specified.

16. A composite journal bearing comprising an imperforate bearing metal shell having an upper key contact face, and provided with longitudinal and end bearing ribs on its under face and furnished with central and longitudinal side cavities and connecting channels between said central and said longitudinal side cavities and a soft metal lining filling said cavities and connecting channels, and extending over the bearing faces of said bearing ribs, said main shell having also a central transverse bearing rib, substantially as specified.

JOHN E. MUHLFELD.

Witnesses:
J. A. POWERS,
T. E. HARVEY.